Dec. 22, 1931.   C. F. KUNZ   1,837,449
SOLAR HEATER
Filed Aug. 17, 1927
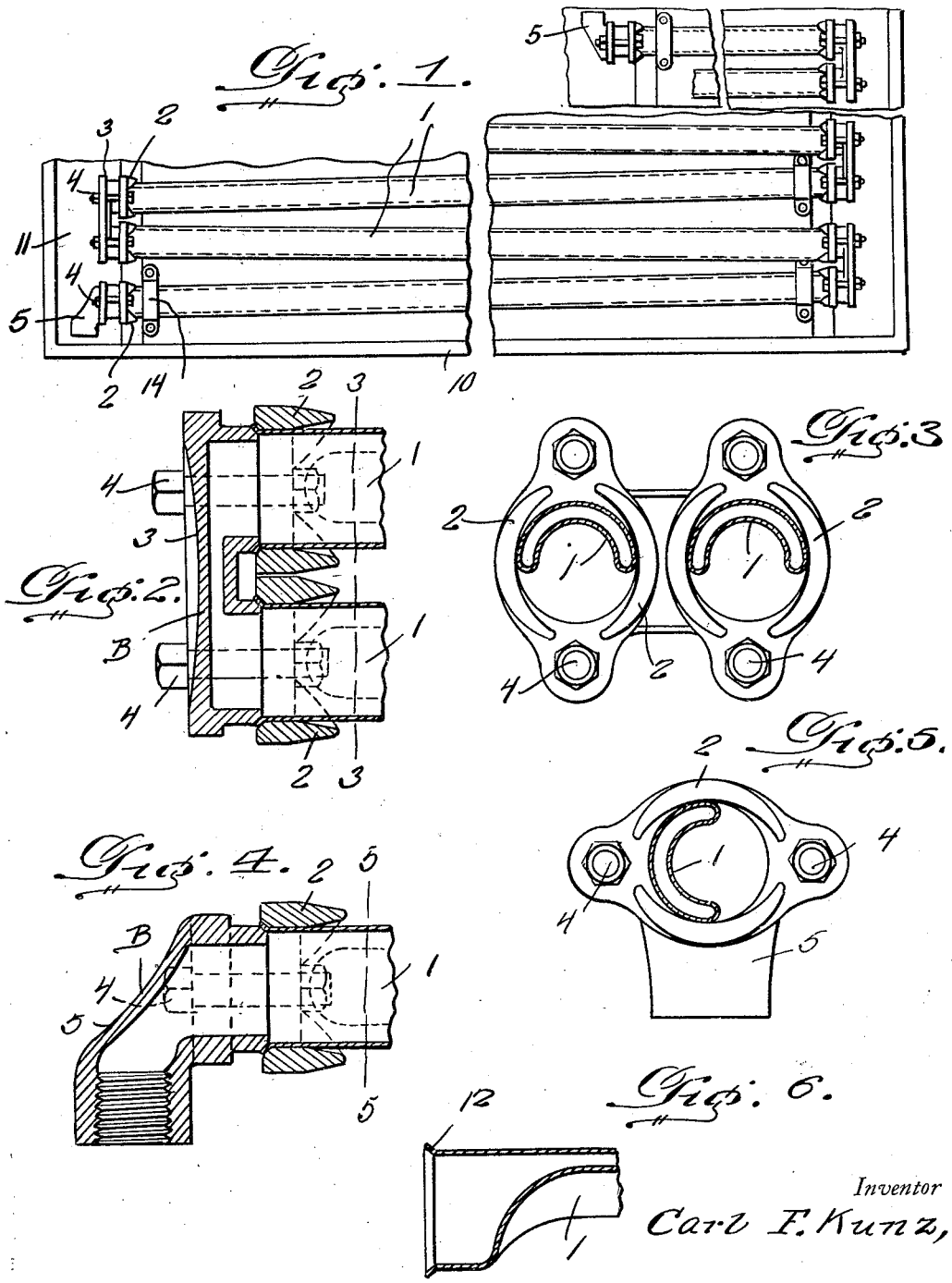
Inventor
Carl F. Kunz,
By Clarence A. O'Brien
Attorney Patented Dec. 22, 1931

1,837,449

UNITED STATES PATENT OFFICE

CARL F. KUNZ, OF PHOENIX, ARIZONA

SOLAR HEATER

Application filed August 17, 1927. Serial No. 213,574.

The present invention relates to a solar heater and has for its prime object to provide an improved structure which provides a large conductive surface in proportion to the amount of liquids contained in the conduits thereof. Another very important object of the invention resides in the provision of a solar heater including a pan with conductors or tubes mounted therein and coupled together in such a manner as to provide a comparatively compact and rigid structure.

Another very important object of the invention resides in the provision of a solar heater comprising a pan with tubes arranged therein, said tubes being constructed to withstand the expansion of the liquids.

A still further very important object of the invention resides in the provision of a solar heater which is simple in its construction, thoroughly efficient and reliable in use, strong and durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a fragmentary plan view of a solar heater embodying the features of my invention, Figure 2 is a sectional view through a return fitting for connecting the heater tubes, Figure 3 is a transverse section taken substantially on the line 3—3 of Figure 2, Figure 4 is a section through one of the outlet or inlet elbows, Figure 5 is a section taken substantially on the line 5—5 of Figure 4, and, Figure 6 is a detail section through one end of one of the tubes.

Referring to the drawings in detail it will be seen that the numeral 10 denotes a pan having troughs 11 at the opposite ends thereof. The pan contains a plurality of heater tubes 1 which are made from round tubing, rolled or pressed into a U-shape, except at the ends which remain round with flanges 12 as clearly shown in Figure 6. The heater tubes are connected by means of bolts 4 extending through the flange 2 and the return fitting 3. The inlet elbow and the outlet elbow are connected to the ends of the outer heater tubes by bolts 4 extending through the flange 2 and the inlet or outlet elbow 5, clamping the flanged end of the U-shaped tube between the fitting and the flange.

The tubes are anchored to the bottom of the pan by means of brackets 14 and the fittings 3 and 5 are disposed over the trough 11.

These heater tubes lose none of their exposure of conductive surface through forming the same into a U-shape, but gain in heating capacity as they allow for a narrow crescent-shaped space between the heating walls of the tubes as may be desired to contain the liquid to be heated. The U-shaped tubes are inverted with respect to the pan 10, incline in opposite directions from one another and are disposed in the same plane to promote the free flowing of the convection current of liquid through the tubes. These heater tubes in their U-shaped formation and the return fittings and elbows with their backs indicated specially by the letters B being bulged inwardly, operate like diaphragms under excessive pressure and permit the expansion of the liquid contained in the conduits, thus allowing contraction and expansion to take place without danger of breakage to the heater.

It will also be seen that these tubes afford a relatively large conductive surface in proportion to the amount of liquid contained therein.

The present embodiment of the invention has been disclosed in detail merely by way of example, since in actual practice it attains the features of advantage enumerated as desirable in the statement of the invention taken together with the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

A solar heater of the class described comprising a tray having a trough at each end thereof, a plurality of pairs of tubes extending across the bottom of the tray, the tubes of each pair being convergently arranged, headers located in one of the troughs and connecting the tubes of the pairs together, headers located in the other trough, each connecting a tube of one pair with a tube of another pair, an inlet member connected to one of the outermost tubes, an outlet member connected to the other outermost tube, the major portion of each tube being bent into crescent shape with its convexed portion uppermost and the ends of each tube being cylindrical shaped and engaging the headers.

In testimony whereof I affix my signature.

CARL F. KUNZ.